Jan. 20, 1959  H. BURGER  2,869,888
TRAILER WITH STEERABLE TANDEM AXLES
Filed July 17, 1956  3 Sheets-Sheet 1

INVENTOR
HERBERT BURGER
By Richardson, Davis and Nordon
his ATT'YS.

Jan. 20, 1959   H. BURGER   2,869,888
TRAILER WITH STEERABLE TANDEM AXLES

Filed July 17, 1956   3 Sheets-Sheet 2

INVENTOR
HERBERT BURGER
By Richardson Davidow Nadow
his ATT'YS.

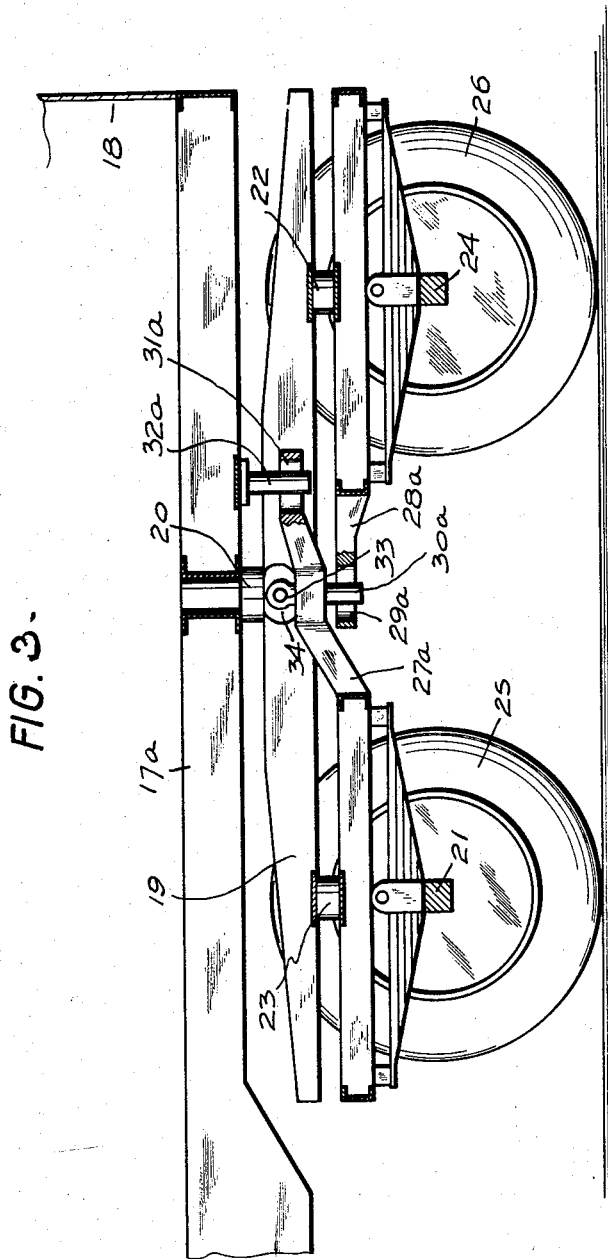

United States Patent Office 2,869,888
Patented Jan. 20, 1959

2,869,888

TRAILER WITH STEERABLE TANDEM AXLES

Herbert Burger, Munich, Germany

Application July 17, 1956, Serial No. 598,319

7 Claims. (Cl. 280—81)

The present invention relates to a novel undercarriage and axle arrangement especially suited for long trailers drawn by draft or tractor units. More particularly, it relates to a novel double axle undercarriage for trailers drawn by automotive vehicles such as trucks or tractors.

Long trailer-trucks naturally have a large carrying capacity and it is accordingly desirable that more than a single axle be provided for the trailer so that the load per axle will not exceed certain predetermined maximum values limited by law. While there is no difficulty in adding a second axle, it has been found in practice that when a cab equipped with a twin-axle trailer passes around a curve, the wheels mounted on the rear axle of the trailer have a shorter turning radius than the wheels mounted on the rear axle of the tractor. This is an unsafe condition since the rear wheels of the trailer can readily jump curbs and in addition the short turning radius can cause the trailer to overturn especially since it carries the bulk of the load.

It is an object of the present invention to provide means for ensuring that the front and rear wheels of a multi-axle trailer follow one another along the same circle in going about a curve.

It is a further object of the invention to provide means for ensuring that when going about a curve the wheels of a multi-axle trailer travel substantially along the same circle as the wheels of the truck or tractor which is pulling said trailer.

Another object of the invention is to provide a twin-axle steering system for a trailer which steers both front and rear axles independently of the steering mechanism of the pulling vehicle while ensuring that the wheels of both trailer axles pass along the same path.

These and other objects and advantages are realized in accordance with the present invention wherein a trailer is provided with a frame connected to an undercarriage by a central bolt or stud, the undercarriage being joined at each end for pivotal movement about a vertical axis corresponding to the center of an axle supporting a pair of wheels. In addition, each axle at its center is provided with a rigid guide rod slidingly engaging the guide rod of the other axle, one of the rods also slidingly engaging the top frame.

The invention will now be described more fully with reference to the accompanying drawings, wherein:

Fig. 3 is an elevation of the trailer shown in Fig. 2.

Figure 1:
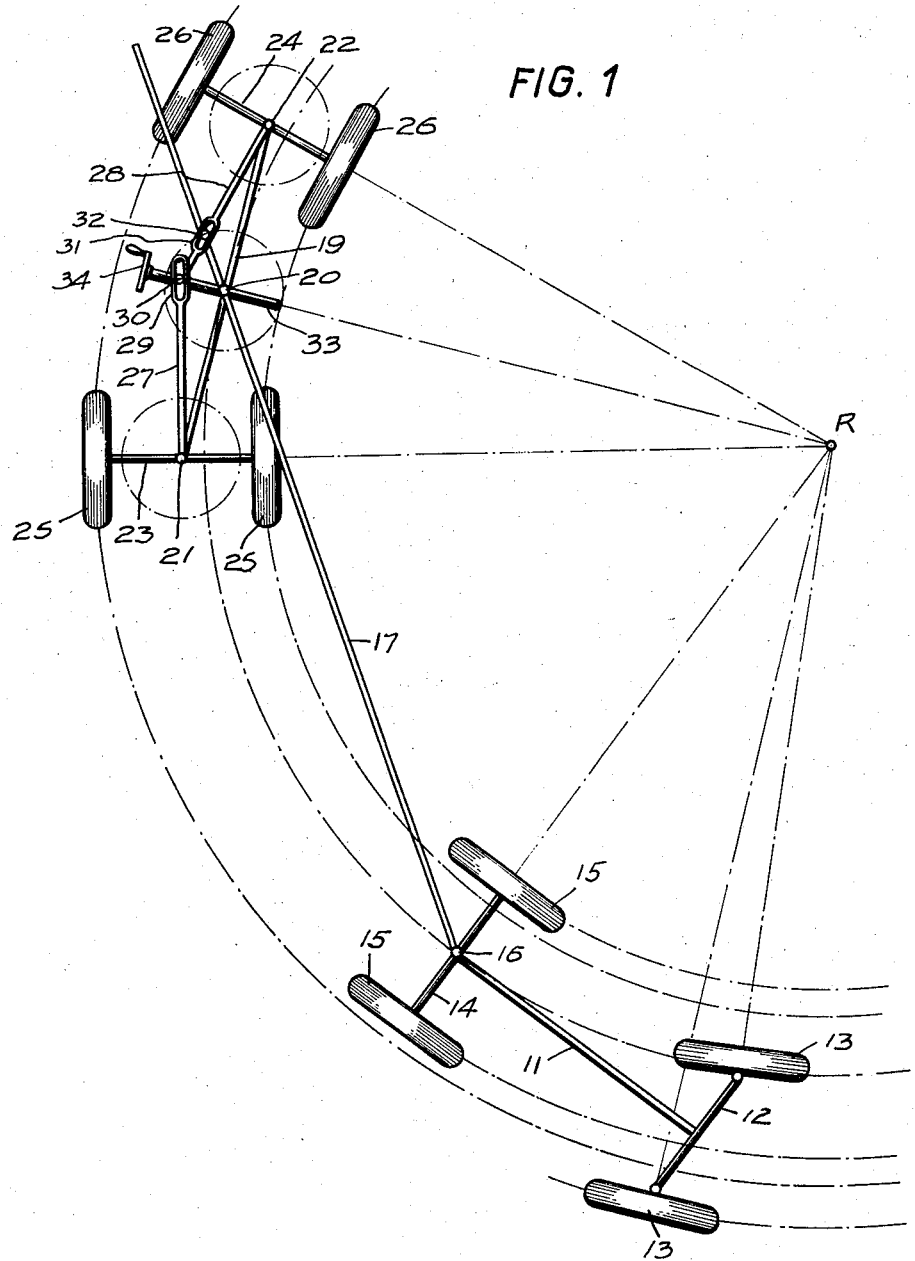
Fig. 1 is a schematic plan view of the frames and undercarriages of a cab-drawn trailer in accordance with present invention.

Referring now more particularly to the drawings, in Fig. 1 there is shown diagrammatically the frame 11 of a cab, truck or tractor including a front axle 12 with wheels 13 and a rear axle 14 with wheels 15. At the center 16 of rear axle 14 there is pivotally secured a drawbar extension portion of the frame 17 of a trailer 18 (Fig. 3). An undercarriage 19 is connected at its center to the frame 17 for pivotal movement about a vertical stud or bolt 20.

At locations which are equidistant from stud 20, the undercarriage is connected for pivotal movement about vertical pivot posts 21, 22 to a front trailer axle 23 and a rear trailer axle 24, respectively. The posts 21, 22 are centrally located on their respective axles 23 and 24, so that they are equidistant from front wheels 25 and rear wheels 26, respectively, which are mounted at the ends of the axles 23 and 24.

To the center of front axle 23 there is rigidly secured a steering rod 27 while a similar steering rod 28 is fixed to rear axle 24. The front axle steering rod 27 is provided near its free end with an elongated slot 29 in which there is received a pin 30 fixed to the steering rod 28, the pin 30 being longitudinally slidable along the slot 29. Rod 28 is also provided with an elongated slot 31 intermediate its ends and a pin 32 carried by the frame 17 is longitudinally slidably received therein.

Figure 2:
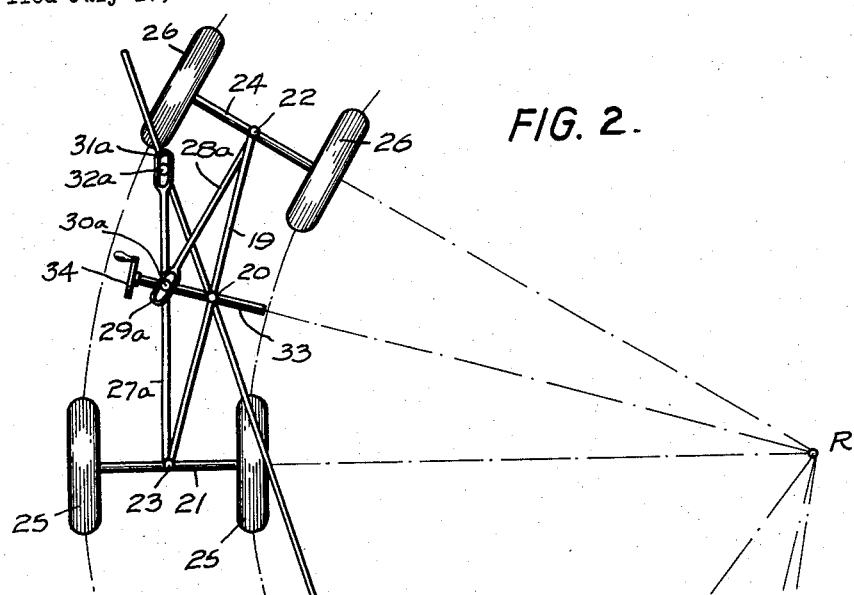
Fig. 2 is a schematic plan view of the frames and undercarriages of a cab-drawn trailer in accordance with a modified embodiment of the present invention.

In the modified embodiment of the invention illustrated in Fig. 2, the front axle steering rod 27a is extended rearwardly beyond its point of sliding connection to the rear axle steering rod 28a and this rearward extension is provided with an elongated slot 31a near its free end. The trailer frame 17a is provided with a vertically extending pin 32a which is freely slidable longitudinally along the slot 31a. A longer lever arm is thus provided for the frame 17a for turning the front steering rod 27a in Fig. 2 than is provided for the frame 17 of Fig. 1 for turning the rear steering rod 28.

In Fig. 1, the front and rear steering rods 27 and 28, respectively are slidably and pivotally interconnected by a pin 30 mounted on the rear steering rod 28 which slides in a slot 29 in the front steering rod 27. In Fig. 2, however, the pin 30a is carried by the front steering rod and the elongated slot for pin 30a is provided in the rear steering rod 28a. Otherwise, Figs. 1 and 2 are identical.

In order to provide positive manual control for steering the trailer wheels independently of the drawbar extension of the frame 17, a transverse horizontal threaded spindle 33 (Fig. 4) is provided which is suitably secured against longitudinal movement and is pivotally connected to the undercarriage 19. The threaded spindle 33 may be rotated by means of a handwheel 34 fixed to its free end. An interiorly threaded nut 35 is mounted on the spindle 33 and may be displaced longitudinally along the spindle 33 by rotation of the handwheel 34. There is a vertically extending recess 36 formed in the nut 35. The recess 36 is adapted to receive the lower end of the pin 30a, the pin 30a being shouldered, as shown, to prevent it from falling through the recess 36.

Figure 4:
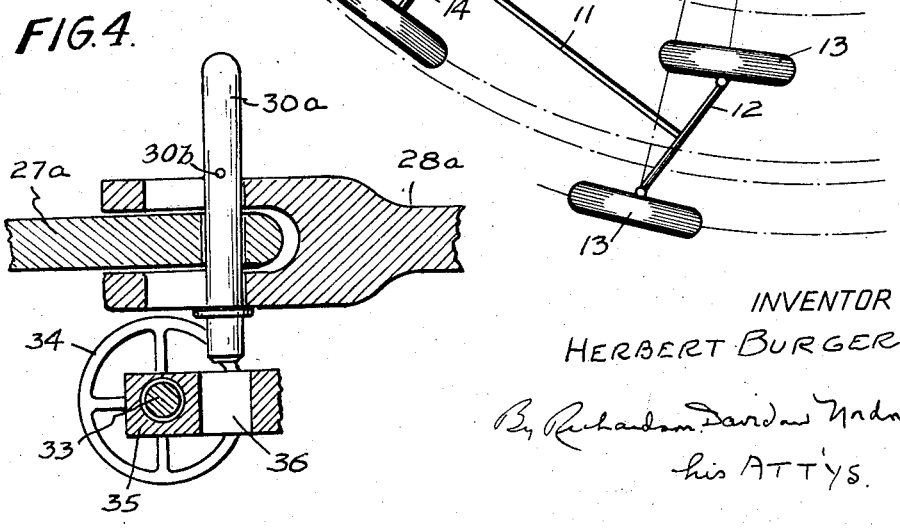
Fig. 4 is an enlarged fragmentary sectional view illustrating a connection between the steering bars for the front and rear axles of the trailer.

Normally, the pin 30a is retained in an elevated position as shown in Fig. 4 so that it will not engage in the recess 36. By removing a transverse bolt 30b, however, the pin 30a may be lowered into the recess 36 in the nut 35 so that the pin 30a and the two steering rods may be moved by turning the handwheel 34 which, in turn, simultaneously steers the front and rear trailer wheels 25 and 26. This manual steering operation takes place when the trailer is parked or is being maneuvered into a parking space. Ordinarily, however, the trailer wheels are steered by angular displacements of the frame 17 of Fig. 1 or 17a of Fig. 2. When steering by means of the handwheel 34, the frame 17 is disconnected from the steering rod 28 of Fig. 1 or 27a of Fig. 2, as by removing the pin 32 or 32a, respectively from its cooperating slot. If desired, the handwheel 34 may be power operated.

The operation of the structure described is as follows:

If the towing vehicle is moving in a straight line, the axles 23, 24 of the trailer will be parallel to each other and the longitudinal axes of the frame 17, undercarriage 19 and the two steering rods 27, 28 will be parallel and superposed. If the towing vehicle makes a left turn as shown in Fig. 1, pin 32 of frame 17 will move in slot 31 to cause the rear steering rod 28 to pivot about post 22 into the position shown. As the rear steering rod 28 is displaced, its pin 30 moves in slot 29 to cause a corresponding pivoting of the front rod 27 about its post 21. Since the steering rods 27, 28 are secured to the trailer axles 23, 24, the axles are both displaced by substantially equal angles relative to undercarriage 19. The axes of axles 23, 24, if extended, will intersect at a point R so that both sets of wheels 25, 26 travel along the same paths having the point R as a common center. The axis of the rear axle 14 of the towing vehicle, if extended, will also pass through the common point R but since front axle 12 is not perpendicular to its wheels, the wheels 13, 15 of the cab do not travel the same paths but travel along concentric circles with their center at point R. The paths of wheels 25, 26 of the trailer are concentric to the paths of the wheels of the towing vehicle and are contained within the innermost and outermost circles defined by the wheels of the towing vehicle. Thus if the wheels of the towing vehicle pass freely around a corner without jumping a curb, the trailer wheels will also pass freely around the same corner.

Various modifications may be made in the specific embodiments of the invention which have been illustratively shown and described without departing from the spirit and scope of the invention as defined in the appended claims.

What is claimed is:

1. In a trailer having a frame for pivotal attachment to a draft device, an undercarriage operatively connected at its central portion with said frame for pivotal movement relative thereto, a pair of wheel-carrying axles pivotally connected at their respective mid-portions with said undercarriage at equal distances from the connection of said undercarriage with said frame, a pair of steering rods rigidly secured to said axles, respectively, said steering rods being slidingly and pivotally connected with each other, and joint means slidingly and pivotally connecting said frame with one of said steering rods at a location spaced from the connection of said one rod with the other rod whereby the wheels of the respective axles traverse substantially the same path.

2. A trailer as defined in claim 1, wherein the sliding connection between said steering rods comprises an elongated slot provided on one rod, and a pin on the other rod and received in said slot.

3. A trailer as defined in claim 2, including means carried by the frame engaging the pin-supporting rod for displacing said pin in said slot.

4. A trailer as defined in claim 1, wherein said joint means connecting said frame with one of said rods comprises an elongated slot and a pin received therein, said connection being separable.

5. A trailer as defined in claim 1, wherein said one steering rod extends beyond its sliding connection with said other steering rod, and said joint means connects said frame with the extended portion of said one rod.

6. A trailer, comprising in combination, a frame adapted to be connected to a towing vehicle; an undercarriage; a centrally located pivotal connection between said frame and said undercarriage, said connection providing for relative movement between said frame and said undercarriage about a vertical axis; front and rear axles pivoted to said undercarriage for steering movement at locations substantially equidistant from said central pivotal connection; a rearwardly extending front steering rod fixedly connected to said front axle; a forwardly extending rear steering rod fixedly connected to said rear axle; means interconnecting said steering rods for substantially equal simultaneous steering movements of said axles in opposite directions; and means connecting said frame to at least one of said steering rods for causing said steering movements to accompany a turning movement of said towing vehicle.

7. A trailer according to claim 6, wherein said last named means is disengageable, said trailer further comprising steering means separate from said frame and carried by said undercarriage, said last named steering means being connectible with at least one of said steering rods for causing said steering movements independently of said frame with said means which connects said frame to at least one of said steering rods disengaged.

References Cited in the file of this patent

UNITED STATES PATENTS

| 689,314 | Koon | Dec. 17, 1901 |

FOREIGN PATENTS

| 881,608 | Germany | July 2, 1953 |